United States Patent
Stasi et al.

(10) Patent No.: US 6,462,157 B1
(45) Date of Patent: Oct. 8, 2002

(54) METHYLMETHACRYLATE/ACRYLIC ACID COPOLYMER ANTINOISE SHEETS

(75) Inventors: Alberto Luca Stasi; Fabio Giberti, both of Milan; Cristiano De Marco, Varese, all of (IT)

(73) Assignee: Atofina, Paris (FR)

( * ) Notice: Subject to any disclaimer, the term of this patent is extended or adjusted under 35 U.S.C. 154(b) by 0 days.

(21) Appl. No.: 09/037,678

(22) Filed: Mar. 10, 1998

(30) Foreign Application Priority Data

Mar. 13, 1997 (IT) .......................................... MI97A0553

(51) Int. Cl.⁷ ................................................. C08F 4/609
(52) U.S. Cl. ..................... 526/224; 526/318; 526/318.4
(58) Field of Search ................................ 524/130, 145; 526/213, 318, 224, 318.4; 428/522, 920, 921

(56) References Cited

U.S. PATENT DOCUMENTS

| | | | | | |
|---|---|---|---|---|---|
| 3,950,314 A | * | 4/1976 | Graff | ............................ | 526/90 |
| 3,957,740 A | * | 5/1976 | Blank et al. | .................... | 526/16 |
| 4,533,689 A | * | 8/1985 | Trayma et al. | ............... | 524/130 |
| 5,527,646 A | * | 6/1996 | Ogino et al. | .................... | 430/5 |

FOREIGN PATENT DOCUMENTS

| | | |
|---|---|---|
| DE | 92 16 548.6 | 12/1992 |
| DE | 93 05 850.0 | 4/1993 |
| DE | 0 600 332 A1 | 11/1993 |
| EP | 0 864 695 * | 8/1998 |

* cited by examiner

Primary Examiner—D. Lawrence Tarazano
(74) Attorney, Agent, or Firm—Arent Fox Kintner Plotkin & Kahn

(57) ABSTRACT

Antinoise and flame-resistant barriers formed by supports and by sheets fixed thereon, characterized by the fact that the sheets consist of a methylmethacrylate copolymer and acrylic acid comprised between 1 and 20% by weight.

3 Claims, No Drawings

METHYLMETHACRYLATE/ACRYLIC ACID COPOLYMER ANTINOISE SHEETS

The present invention relates to the preparation of high thickness acrylic sheets utilizable in the manufacture of antinoise barriers.

In particular the present invention relates to transparent and high thickness polymethylmethacrylate sheets usually employed for antinoise barriers in motoways, viaducts, bridges, etc.

Antinoise barriers formed of high thickness polymethylmethacrylate sheets (10–25 mm) are known in the prior art. Also sheets with lower thicknesses (4–10 mm) are also known, which find minor application in the antinoise barriers field and are utilized especially in the luminous signs field, for preparing panels for applications in building both for indoors and outdoors and in the sanitary field (for instance shower box), etc. Such material results, indeed, particularly advantageous for the applications mentioned above due to the high resistance to external agents, the optimal optical properties and the high rigidity thereof. This last characteristic results even more particularly advantageous since the structures above mentioned must be subject to high pressures due, for example, to the high speed wind or to the close passage of cars and heavy transport.

It is known, however, that such polymethylmethacrylate sheets show a high speed of the flame propagation and a low fire-resistance. To improve the behaviour of acrylic manufactured articles in the presence of limited fires it is possible, therefore, to add fire-retardant compounds known in the art, such as halogenated compounds or phosphor-based compounds. However such compounds result harmful and require therefore special expedients in the production cycle with a consequent and substantial increase in costs.

Moreover the addition of the above mentioned compounds determines a sensitive worsening of the thermo-mechanical and optical properties of the PMMA sheets mentioned above. Besides these compounds are not, or are about to be no longer utilized because of the more and more restrictive laws of the various countries.

It is known in the art that to increase the flame resistance properties, a methylmethacrylate (PMMA) homopolymer obtained by casting processes, is utilized. With such process, indeed, sheets can be obtained with polymer having molecular weights higher than those obtained by extrusion. This is the reason why the above mentioned properties result superior.

It is known also that adding certain comonomers, such as for instance acrylates and styrene, increases the fire resistance of methylmethacrylate (MMA). See for example the patent EP-600.332. However alkyl-acrylates and styrene do not have very high resistances of flame propagation and moreover the obtained sheets show a too high deformation, even if smaller with respect to the homopolymer. This leads to a worsening of the optical properties of the sheet, which are, instead, properties to be maintained. All this is still more evident in the case of low thickness sheets.

It was therefore felt the need to have available sheets both for antinoise barriers and for the other applications indicated above allowing to obtain improved resistance properties to the flame propagation, a higher rigidity and a lower tendency to bending (distortion) or local deformation after exposition to the flame.

The Applicant has now surprisingly and unexpectedly found that by utilizing particular comonomers it is possible to prepare methylmethacrylate-based copolymers meeting the flame resistance properties, showing a lower tendency to warping while maintaining at the same time good thermo-mechanical properties and optimal optical properties.

An object of the present invention consists therefore in antinoise and flame-resistant sheets formed by supports and by sheets fixed thereon, cnharacterized in that the sheets, totally or at least on the surface, are formed by a methylmethacrylate copolymer and acrylic and/or methacrylic acid comprised between 1 and 20% by weight, preferably between 2 and 15% by weight, even more preferably between 3 and 10% by weight, when the copolymer is obtained by extrusion processes, or the content of said acids is comprised between 1 and 30% by weight, preferably between 2 and 25% by weight, even more preferably between 3 and 20% by weight, when the copolymer is obtained by casting. The antinoise barriers of the present invention are moreover characterized in that they do not contain antiflame compounds of halogenated type and/or phosphor-based compounds.

In the case of the copolymers of the invention obtained by casting, copolymers having weight average molecular weight (MW) ranging from about 20,000 to 2,000,000, preferably higher than 1,000,000, are obtained. If desired, also crosslinked copolymers can be obtained with the casting process to increase in particular the sheet chemical resistance.

When extrusion processes are utilized, the copolymer has lower molecular weight than the casting process, and i.e. generally from 20,000 to about 180,000, preferably between 80,000 and 130,000.

The supports to which the acrylic sheet is fixed are generally formed by metals, such as for intance aluminium.

The test that the antinoise and flame-resistant sheets must generally satisfy is described in ZTW-LSW 88 standard. It requires that a sheet, for instance 2 m×1 m×15 mm, is inserted in a metal U-shaped structure bound on a cement support of 25 cm of height for the length of the whole structure. At the base of such structure two containers (30×20×30 cm), are placed at about ⅓ and ⅔ of the width of the structure, formed by wire netting wherein 600 g of wood wool are placed to which fire is given. After one hour the effects of the flame on the surface of the acrylic sheet are evaluated. The sheets of the invention satisfy the above mentioned test. The examples reported hereinafter to give a wider representation of the present invention, have been carried out on samples of more limited sizes.

The copolymer according to the present invention can be produced according to anyone of the polymerization processes known in the art. The polymerization in suspension or in bulk results to be particularly preferred. In the polymerization processes a chain transfer agent can be used, for instance mercaptanes-based, such as butyl-mercaptane (BM), 2-ethyl-hexyl-mercapto-propionate, octyl-mercaptane (OM), n-dodecyl-mercaptane, t-dodecyl-mercaptane or mixtures thereof, to obtain copolymers having lower molecular weight, particularly suitable for obtaining sheets by extrusion.

If desired during the preparation of the copolymer optional components can also be added, such as for instance UV adsorbers, as Tinuvin® P; lubricants, such as for instance stearic acid, palmitic acid and the corresponding alcohols; thermal stabilizers, such as for instance disulphides.

By the term acrylic sheets are meant sheets formed by homopolymers or copolymers of the acrylic and/or methacrylic acids and their esters wherein the alkylic group contains up to 8 carbon atoms, such as for instance methylmethacrylate, methylacrylate, ethylacrylate, butylmethacrylate, 2-t-hexyl-acrylate.

When the copolymer of the invention is utilized only on the surface of the sheets, obviously the flame-resistance properties are maintained, while the mechanical properties will depend on the composition of the intermediate sheet. These types of sheets are obtained, for instance, by co-extrusion.

The present invention will now be better illustrated by the following working examples, which have a merely illustrative purpose but not limitative of the scope of the present invention.

EXAMPLE 1

The samples considered are reported in Tables I and II and the horizontal inflammability test reported hereinunder has been carried out thereon.

Horizontal Inflammability Test

The test is carried out according to UL 94 HB (ASTM D 635, D 4804, IEC 707, ISO/DIS 1210.2) standards and consists in determining the flame propagation rate in the horizontal direction starting from an end of the sample. Since the sample thickness affects the flame propagation, since very thin samples burn more quickly, the above rules contemplate different values in the case of samples of different thickness. More precisely, the propagation rates of horizontal flame not to be exceeded to obtain the HB classification by UL 94 test result the following:

for samples having a thickness<3 mm: 75 mm/min;
for samples having a thickness 3–13 mm: 40 mm/min.
The test consists in stabilizing the flame for the first stretch of sample having a length of 25 mm and in determining the time employed by the flame to cover the further 75 mm under constant propagation rate. The results obtained are reported in Table III.

According to the UL 94 HB standard, at the beginning of the test, the sample is left for 30" exposed to the flame so that the spark starting occurs.

The results have shown how the MMA/AE and MMA/AM copolymers need an exposure time well lower than 30", while the MMA/AMA copolymers require a spark starting time of about 25 seconds.

From the data reported in tables I and III it is shown how the sample B gives rise to a flame propagation rate well higher than the homopolymer A. This result is justified by the fact that the molecular weight of the sample A is much higher than that of the sample B (weight average molecular weight MW 1,500,000 v 130,000).

The comparison between samples B and C shows how by utilizing higher thicknesses there is a decrease of the propagation rate.

By comparing a composition of the invention (sample D) with sample C it is shown that the propagation rate remains the same although the molecular weight of D is lower than that of C (120,000 v 130,000).

The comparison between samples E, F, and G with D shows that by increasing the AMA amount, although lowering the molecular weight of the copolymer, the propagation rate noticeably decreases. This result is clearly different with respect to the case of AE since with the alkyl-acrylates having a comonomer concentration higher than 10%, any variation is no longer noticed.

If the data reported in Tables II and III are compared, the molecular weight of the polymers being equal, it can be observed that the effect on the decrease of the flame propagation rate is remarkably higher in the case AMA is utilized as comonomer.

It has been, moreover, shown that the MMA/AE and MMA/AM copolymers and the MMA homopolymer during the test described above give rise to substance dropping which results, therefore, capable of spark starting in its turn the flame on the already dropped substance. The MMA/AMA copolymers of the present invention, instead, even though they too give rise to substance dropping, assure a greater safety since the dropped substance does not spark start any flame. The cast polymethylmethacrylate samples, instead, burn without substance dropping.

EXAMPLE 2

It is described hereunder the bending (distortion) test to which the samples in question have been subjected.

Bending Test

A sample of methylmethacrylate homopolymer (sizes 200×50×4 mm) obtained by compression molding from beads was fixed to laboratory pliers placed at 10 mm from its lower end. The test was inclined of 45° with respect to the vertical axis and exposed for 30" to a blue butane gas flame having a length of 20 mm placed perpendicularly to the sample surface, distant 200 mm from the same and directed towards the middle of the sample. After 30" the flame was removed and the sample was immediately cooled by immersion in cool water. Then the damages reported by the surface exposed to the flame were observed and the bending (i) intended as mm distance from the original straight line of the upper profile of the sample itself was measured. The results obtained are reported in Table IV.

EXAMPLE 3

It has been proceeded exactly as in Example 2, but it has been considered a sample formed by the copolymer 90% methacrylate+10% ethylacrylate. The results obtained are reported in Table IV.

EXAMPLE 4

It has been proceeded exactly as in Examples 2 and 3, but it has been considered a sample formed by the copolymer 90% methylmethacrylate+10% methacrylic acid. The results obtained are reported in Table IV.

From the comparison of the results reported in Table IV it is noticed that when one operates with AMA as comonomer it is not observed the formation of bubbles and cracks on the surface exposed to the flame, while with the homopolymer both bubbles and cracks are observed and with AE as comonomer the formation of bubbles is observed. Moreover the bending (distortion) which is an index of the sheet deformation, is very limited in the case AMA is utilized as comonomer, while it results very marked in the case of the homopolymer and of the copolymer with AE as comonomer.

TABLE I

SAMPLES HAVING HIGH AVERAGE MOLECULAR WEIGHT
(PM > 100,000)
(Polymerization carried out with sulphide chain transfer agent
OM < 0.25%)

| | | |
|---|---|---|
| A | Casted Homopolymer MMA (MW = 1,500,000) | samples obtained by a sheet with a thickness ≦ 3 mm |
| B | ALTUGLAS ® EX: 96% MMA + 4% AE (MW = 130,000) | samples obtained by a sheet with a thickness of ≦ 3 mm |
| C | ALTUGLAS ® 9EL: 96% MMA + 4% AE (MW = 130,000) | compression molded samples from beads: thickness~7 mm |

TABLE I-continued

SAMPLES HAVING HIGH AVERAGE MOLECULAR WEIGHT
(PM > 100,000)
(Polymerization carried out with sulphide chain transfer agent
OM < 0.25%)

| | | |
|---|---|---|
| D | Copolymer 97% MMA + 3% AMA (MW = 120,000) | compression molded samples from beads: thickness~7 mm |
| E | Copolymer 92% MMA + 8% AMA (MW = 110,000) | compression molded samples from beads: thickness~7 mm |
| F | Copolymer 90% MMA + 10% AMA (MW = 110,000) | compression molded samples from beads: thickness~7 mm |
| G | Copolymer 80% MMA + 20% AMA (MW = 75,000) | compression molded samples from beads: thickness~7 mm |

TABLE II

SAMPLES HAVING LOW AVERAGE MOLECULAR WEIGHT
(MW~80,000)
(Polymerizations carried out with sulphide chain transfer agent OBM equal
to 0.27%) (wherein OBM is a mixture of octyl mercaptane (OM) and butyl
mercaptane (BM) in the ratio 1:1 by moles)

| | | |
|---|---|---|
| H | Homopolymer: 100% MMA (MW = 80,000) | compression molded samples from beads: thickness ≧ 3 mm |
| I | ALTUGLAS ® 9D: 98% MMA + 2% AMA (MW = 90,000) | compression molded samples from beads: thickness 3 mm |
| L | Copolymer 90% MMA + 10% AE (MW = 80,000) | compression molded samples from beads: thickness ≧ 3 mm |
| M | Copolymer 80% MMA + 20% AE (MW = 80,000) | compression molded samples from beads: thickness ≧ 3 mm |
| N | Copolymer 90% MMA + 10% AMA (MW = 80,000) | compression molded samples from beads: thickness ≧ 3 mm |

TABLE III

| SAMPLE | RATE (mm/min) |
|---|---|
| A | 27–34 |
| B | 40–45 |
| C | 30–35 |
| D | 33–34 |
| E | 26–30 |
| F | 25–27 |
| G | 17–23 |
| H | 40–45 |
| I | 38–41 |
| L | 32–34 |
| M | 32–34 |
| N | 24–25 |

TABLE IV

| SAMPLE | RESULTS |
|---|---|
| Homopolymer 100% MMA (Example 2) | Formation of bubbles and cracks on a burnt surface > 16 cm$^2$ i = 6 mm |
| Copolymer 90% MMA + 10% AE (Example 2) | Formation of bubbles on a burnt surface of ~9 cm$^2$ i = 3.6 mm |
| Copolymer 90% MMA + 10% AMA (Example 3) | No surface damage i < 1 mm |

What is claimed is:

1. An extruded sheet devoid of antiflame compounds and consisting essentially of a methylmethacrylate and 3–10% by weight of an acrylic and/or methacrylic acid copolymer.

2. The sheet according to claim 1, including UV absorbers, lubricants and thermal stabilizers.

3. The sheet according to claim 1, wherein the extruded sheet is obtained by employing mercaptan chain transfer agents.

* * * * *